US005565272A

United States Patent [19]

Masui et al.

[11] Patent Number: 5,565,272

[45] Date of Patent: Oct. 15, 1996

[54] GRAIN ORIENTED SILICON STEEL SHEET HAVING EXCELLENT PRIMARY FILM PROPERTIES

[75] Inventors: Hiroaki Masui, Kitakyushu; Morio Shiozaki, Himeji; Nobuyuki Takahashi, Kitakyushu; Hisashi Kabayashi, Kawasaki; Takeo Nagashima, Futtsu; Shuichi Yamazaki, Futtsu; Hiroyasu Fujii, Futtsu, all of Japan

[73] Assignee: Nippon Steel Corporation, Tokyo, Japan

[21] Appl. No.: 911,637

[22] Filed: Jul. 10, 1992

[30] Foreign Application Priority Data

| | | | |
|---|---|---|---|
| Jul. 10, 1991 | [JP] | Japan | 3-170243 |
| Jul. 9, 1992 | [JP] | Japan | 4-182081 |

[51] Int. Cl.[6] ..................... B32B 15/04

[52] U.S. Cl. ..................... 428/432; 428/409; 428/469; 428/472; 428/472.1; 428/697; 428/702; 428/704; 148/110; 148/113; 148/308; 148/309

[58] Field of Search ..................... 428/704, 688, 428/689, 697, 702, 457, 469, 472, 472.1, 432, 409, 410; 148/110, 111, 113, 307, 308, 309

[56] References Cited

U.S. PATENT DOCUMENTS

| | | | |
|---|---|---|---|
| 3,856,568 | 12/1974 | Tanaka | 427/372.2 |
| 4,160,681 | 7/1979 | Miller, Jr. | 428/472 |
| 4,287,006 | 9/1981 | Hiromae | 148/113 |
| 4,655,854 | 4/1987 | Nishiike | 148/111 |
| 4,698,272 | 10/1987 | Inokuti | 428/469 |
| 4,713,123 | 12/1987 | Inokuti | 427/127 |
| 4,897,131 | 1/1990 | Wada | 148/307 |
| 4,906,530 | 3/1990 | Nishiike | 148/307 |

FOREIGN PATENT DOCUMENTS

| | | |
|---|---|---|
| 48-39338 | 6/1973 | Japan . |
| 61-235514A | 10/1986 | Japan . |
| 61-246321A | 11/1986 | Japan . |
| 1398504 | 6/1975 | United Kingdom . |

OTHER PUBLICATIONS

Patent Abstract of Japan, vol. 10, No. 184, (E–415) (2240) Jun. 27, 1986.

Patent Abstracts of Japan, vol. 10, No. 99, (E–396) (2156) Nov. 29, 1985.

Journal of Applied Physics, vol. 57, No. 8, Apr., 1985, pp. 4214–4216, "The Effect of Forsterite Film . . . ,", T. Konno et al. European Search Report EP 92 11 1694.

*Primary Examiner*—Ellis Robinson
*Assistant Examiner*—Timothy M. Speer
*Attorney, Agent, or Firm*—Kenyon & Kenyon

[57] ABSTRACT

A grain oriented silicon steel sheet having excellent primary glass film property and magnetic property, comprising 2.0 to 5.0% by weight of Si, wherein a primary glass film formed during secondary recrystallization annealing is composed mainly of forsterite ($Mg_2SiO_4$) and an oxide containing Al, mainly of spinel ($MgAl_2O_4$), or Al and Si, mainly of cordierite ($MgO_2Al_4Si_5O_{18}$) and/or sapphirine ($Mg_4Al_{10}Si_2O_{23}$), and in an analysis of the surface of the steel sheet by glow discharge optical emission spectrometry analysis (GDS analysis), a peak derived from Al is separated from a peak derived from Mg, and, preferably, the peak derived from Al is separated from the peak derived from Mg and the distance (time) from the surface of the steel sheet at which the peak derived from Al is 1.2 times or more the distance from the surface of the steel sheet at which the peak derived from Mg appears.

2 Claims, 7 Drawing Sheets

GRAIN ORIENTED SILICON STEEL SHEET HAVING EXCELLENT PRIMARY FILM PROPERTIES

BACKGROUND OF THE INVENTION

1. Field of the Invention

The present invention relates to a grain oriented silicon steel sheet having an excellent primary glass film and magnetic properties.

2. Description of the Prior Art

A grain oriented silicon steel sheet has been used as a magnetic core material of electrical equipment and is required to have a low iron loss. Conventionaly, many improvements contributing to a lowering of the iron loss value have been conducted.

It is known that creating tension to the steel sheet is useful, and lowers the iron loss of the grain oriented silicon steel sheet.

To induce tension to the steel sheet, it is useful to form a primary glass film (hereinafter refferred to as "primaly film") constituted of a material having a coefficient of thermal expansion lower than the steel.

The primary film, i.e., oxide film, is formed which an oxide on the surface of the steel sheet reacts with an annealing separator (a separating agent to prevent sticking among the steel sheets during annealing) and can induce tension in the steel sheet, and this primary film has excellent adhesion.

The conventional process for the formation of an insulation primary film used in the art comprises subjecting a silicon steel strip having a final sheet thickness to a primary recrystallization annealing involving decarbonization, coating the annealed strip with a slurry of magnesia (MgO) as an annealing separator (i.e., a separating agent to prevent sticking among the steel sheets during annealing), drying the coating strip, winding the dried strip to form a strip coil and the final annealing for coil in the secondary recrystallization. During this secondary recrystallization annealing step, it causes the Si or silicon oxide in the steel sheet to react with the annealing separator, to thus form a ceramic insulating primary film called "forsterite" ($Mg_2SiO_4$).

The forsterite imparts tension to the steel sheet, to thus reduce (improve) the iron loss of the grain oriented silicon steel sheet, and therefore, the state of the forsterite formed on the surface of the grain oriented silicon steel sheet plays an important role in the growing of a grain having a {110} <001> (Goss) orientation in the secondary recrystallization annealing step. Specifically, when raising the temperature in the secondary recrystallization annealing step, and when a secondary recrystallization is conducted without the formation of a sufficiently dense primary film, a fine nitride or sulfide serving as an inhibitor comes off as it is or through decomposition in an early stage, so that, upon a temperature rise, the amount of inhibitor that preferentially grows grains having a Goss orientation and inhibits the grain growth having another orientation decreases and provides a product having very poor magnetic properties and a texture called a "fine grain" wherein grains having a Goss orientation grow only in part or do not grow at all. In order to form a dense primary film, an attempt has also been made to coat a steel sheet (strip) with the annealing separator comprising magnesia (MgO), and added thereto, titanium oxide ($TiO_2$ or the like) or another compound.

Whether, the forsterite is formed in a rather low temperature range, depends significantly on the selection of the annealing separator. The annealing separator consists mainly of MgO in most of the proportion, $TiO_2$, boric or boride base compounds and sulfide or sulfuric base compounds, etc. Especially boride or boric base or sulfide or sulfuric base compounds are necessary. When adding these compounds to MgO and $TiO_2$, both MgO and $SiO_2$, which were formed in the primary recrystallization annealing react even in a rather low temperature range of the secondary recrystallization annealing and also enable forsterite to form in the low temperature range.

Gas composition in the secondary recrystallization annealing is another important factor that affects the primary film formation. For example, moderate oxidizing atmosphere at 600°–850° C. in the annealing (Japanese Patent Application No. 1-91956) or such a method that the sum of nitrogen and Ar gas pressure ratio is 30% or more under nitrogen gas equal and more of 25% and remnants covered with hydrogen gas in the temperature range up to 800°–850° C. (Japanese Patent Application No. 2-301919), are also effective.

Furthermore, as shown in a patent of Japanese Unexamined Patent Publication No. 48-39338, a tension in the silicon steel sheet that can be obtained by a method of coating a compound of colloidal silica and phosphate on the steel sheet followed by baking, is efficient to decrease the iron loss (core loss). Therefore, such a treatment as tension providing insulation coating (secondary coating) on the steel sheet with primary film formed in the secondary recrystallization annealing, is one of the most conventional techniques in the grain oriented silicon steel sheet production. In this case, however, if a thickness of the insulating coating film is increased too much, to obtain a lot of tension in the steel sheet, the spacing factor decreases, but also adhesion of the coating film deteriorates.

On the other hand, methods other than these such as a method to obtain a lot of tension in the steel sheet as dry coating TiN or TiC on the sheet by way of CVD (Chemical Vapor Deposition) or PVD (Physical Vapor Deposition) are invented in the patents of Japanese Examined Patent Publication No. 63-35684 and No. 63-35685. These methods have rather effective tension in the sheet. But they require higher production cost because of the high degree of vacuum facilities and the long treatment time.

In these prior art techniques, it is not easy to stably form a satisfactory primary film on the surface of a silicon steel sheet. This is attributable to the fact that the elucidation of the mechanism for the formation of the primary film is not always sufficient. Furthermore, since no sufficient elucidation of the relationship between the structure of the primary film and the production conditions has been made, the formation of the primary film is conducted mainly based on experience, so that the formation of primary film cannot be freely controlled.

SUMMARY OF THE INVENTION

In order to solve the above-described problems of the prior art and to provide a grain oriented silicon steel sheet having a secondary recrystallized grain having a stable Goss orientation through the formation of a stable primary film on the surface of the silicon steel sheet, the present invention provides a grain oriented silicon steel sheet having excellent glass film property and magnetic property, comprising 2.0 to 5.0% of silicon, wherein a primary film formed during secondary recrystallization annealing is composed mainly of forsterite ($Mg_2SiO_4$) and an oxide containing Al or Al and Si.

The subject matter of the present invention is as follows.

A grain oriented silicon steel sheet having excellent film property and magnetic property, comprising 2.0 to 5.0% by weight of Si, wherein a primary film formed during secondary recrystallization annealing is composed mainly of forsterite ($Mg_2SiO_4$) and an oxide containing Al mainly of spinel ($MgAl_2O_4$), or Al and Si, mainly of cordierite ($MgO_2Al_4Si_5O_{18}$) and/or sapphirine ($Mg_4Al_{10}Si_2O_{23}$).

Also, a grain oriented silicon steel sheet, comprising 2.0 to 5.0% by weight of Si, which has such a primary film that, in an analysis of the surface of the steel sheet by glow discharge optical emission spectrometry (GDS analysis), a peak derived from Al is separated from a peak derived from Mg, and, preferably, the peak derived from Al is separated from the peak derived from Mg and the distance (time) from the surface of the steel sheet at which the peak derived from Al is 1.2 times or more the distance from the surface of the steel sheet at which the peak derived from Mg appears.

Also, the primary film is formed through the use of an annealing separator composed mainly of MgO and, added thereto, a boron oxide or an oxide of antimony sulfate prior to the secondary recrystallization annealing.

DESCRIPTION OF THE PREFERRED EMBODIMENTS

The present invention will now be described in more detail.

Further experiments have been carried out on the primary film of the silicon steel sheet so that this invention shall be ascertained. Consequently it is again confirmed that the spinel ($MgAl_2O_4$) existing together with forsterite acts to improve (decrease) the iron loss much more than when only of forsterite ($Mg_2SiO_4$) exists. Samples with various amounts of acid soluble aluminum from 200 ppm to 550 ppm, are fabricated in a thickness of 0.22 mm.

Figure 1:
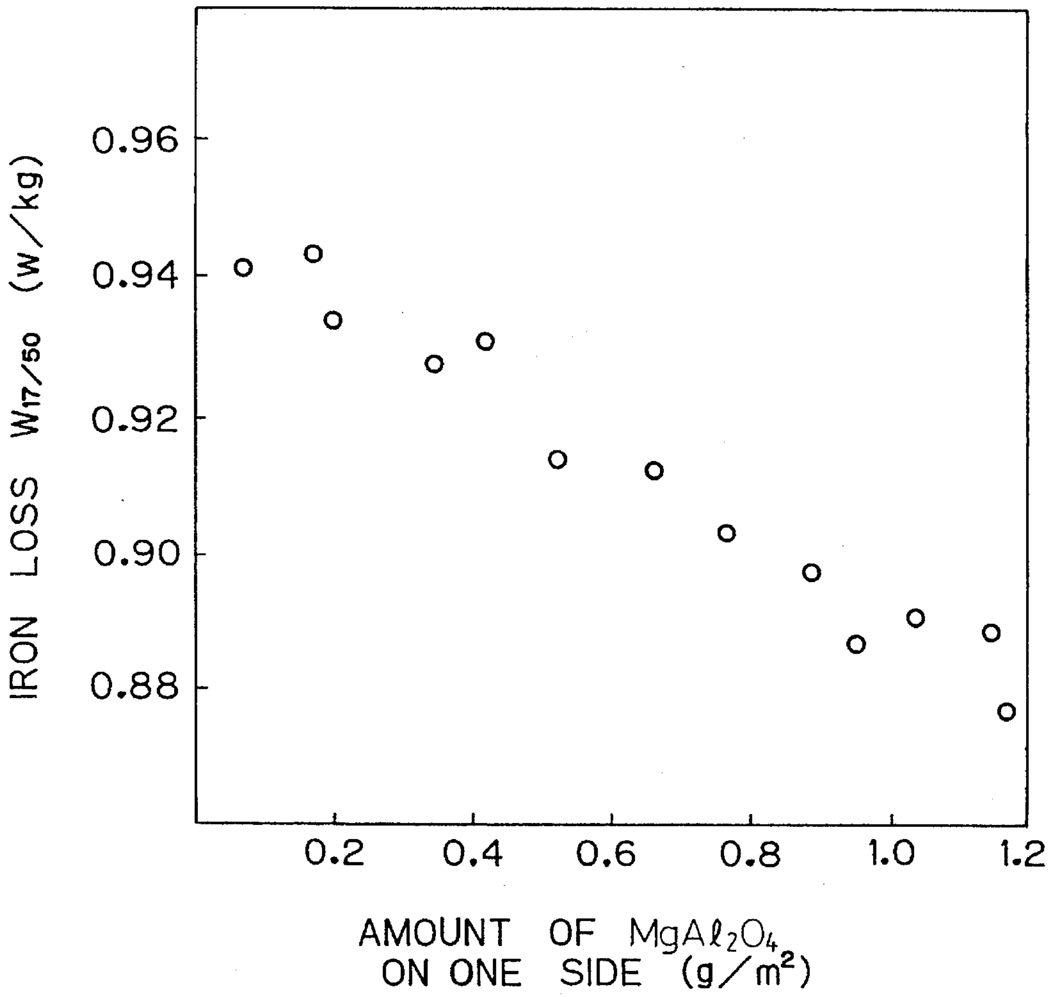
FIG. 1 is a diagram showing the relation between the amount of $MgAl_2O_4$ and iron loss.

FIG. 1 shows the relationship between iron loss and the amount of spinel in the primary film on the selected samples satisfied with total oxide amounts of nearly 3.6 g/m$^2$ and magnetic flux density ($B_8$) of nearly 1.9 T(Tesla). This figure shows a larger amount of spinel results in less (better) iron loss.

Figure 2:
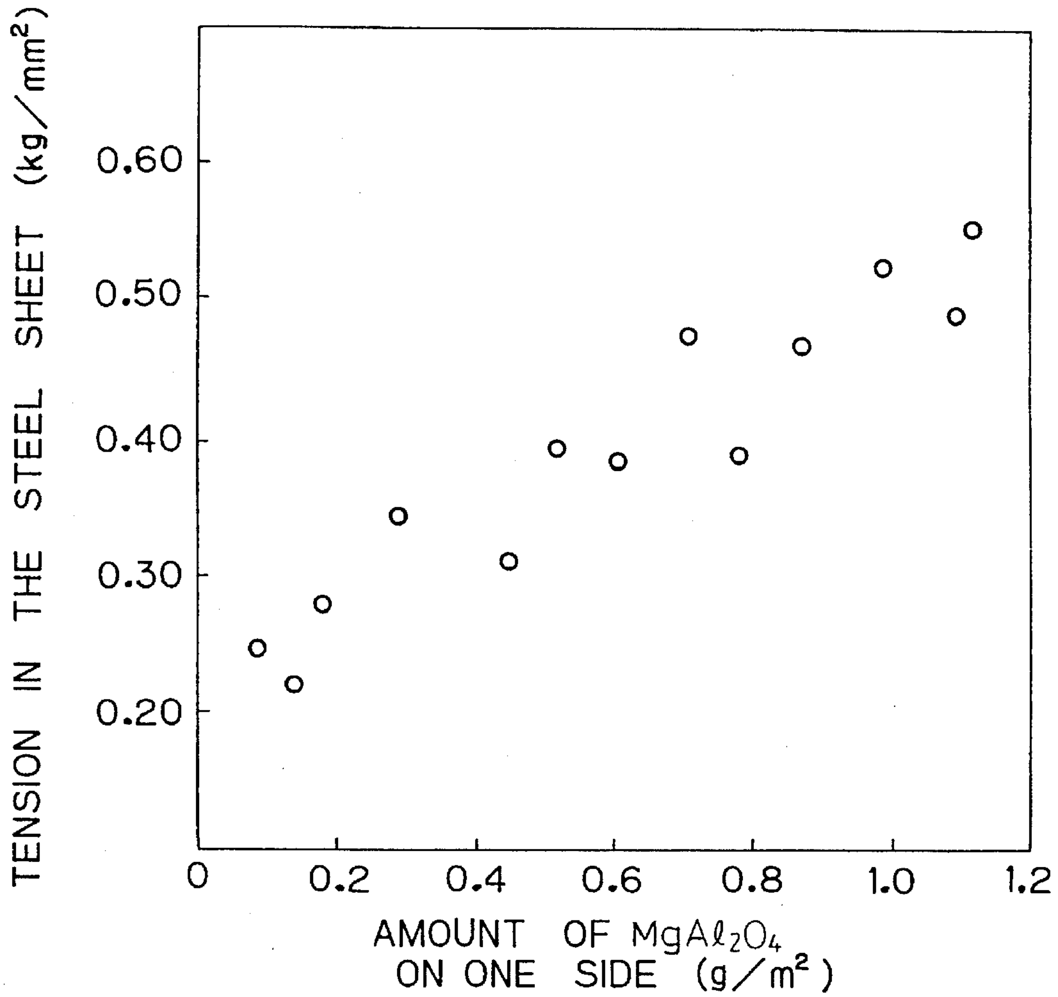
FIG. 2 is a diagram showing the relation between the amount of $MgAl_2O_4$ and tension in the steel sheet.

In order to explain the reason above, the tension in the sheet was measured on the samples satisfied with total oxide amounts of nearly 3.6 g/m$^2$. As a result, it has become explicit that the tension in the sheet becomes large when the primary film contains spinel together with forsterite and increases proportionally with the amount of spinel in the primary film, as shown in FIG. 2.

The coefficients of thermal expansion of the grain oriented silicon steel sheet, forsterite and spinel are about $15\times10^{-6}$/K, about $11\times10^{-6}$/K and about $9\times10^{-6}$/K. Therefore, it is considered that the larger the amount of the formation of spinel different from the steel sheet in the coefficient of thermal expansion, the larger the tension imparted to the steel sheet and consequently the lower the iron loss.

Assuming that the forsterite and spinel have a dense structure, the calculated values of the coating tension per/1 µm of one surface of a 0.22 mm-thick steel sheet are 330 g/mm$^2$ and 1070 g/mm$^2$, respectively. That is, it is apparent that with the same thickness, the tension effect of spinel is about 3 times that of forsterite.

The amount of spinel is defined as follows:

This value coincides with a calculation value deduced by conversion of aluminum content in the oxide layer of the primary film separately deprived from the steel sheet after the secondary recrystallization annealing.

This aluminum content can be determined to be that of spinel, because substances confirmed by X ray diffraction analysis are just forsterite, spinel and manganese and not alumina oxide ($Al_2O_3$). Aluminum determined above, is therefore considered to be spinel. The main substances of the oxide layer of the primary film are forsterite, spinel and a small amount of cordierite, sapphirine or manganese sulfide and others.

The present inventors have conducted studies on the means for using spinel as a constituent element in addition to forsterite as a primary film. In the studies, they have found that when forsterite is formed at a low-temperature stage of the secondary recrystallization annealing, a primary film comprising forsterite and spinel can be finally formed. It is considered that when the forsterite is formed at a low-temperature stage, acid-soluble aluminum contained in the steel is diffused on the surface and Al is incorporated in the formed forsterite to form spinel.

Also when the forsterite is not sufficiently formed, the resultant primary film is unsatisfactory as an insulation film and does not serve as a primary film that is dense and has an excellent adhesion to the matrix.

The present inventors have made further studies on the means for stably forming a good primary film and, as a result, have found that it is important to form a primary film composed mainly of forsterite and an oxide containing Al or Al and Si. Further, they have found that a further improvement in the film property can be attained when the oxide Containing Al is composed mainly of spinel ($MgAl_2O_4$), and a still further improvement in the film property can be attained when the oxide containing Al and Si is composed mainly of spinel ($MgAl_2O_4$) and cordierite ($Mg_2Al_4Si_5O_{18}$) and/or sapphirine ($Mg_4Al_{10}Si_2O_{23}$). The coefficients of thermal expansion of the cordierite and sapphirine are about $1.6\times10^{-6}$/K and about $6\times10^{-6}$/K.

Further, the present inventors have found that the distribution and arrangement of the forsterite and spinel are important to the formation of an excellent primary film. The present inventors have adopted glow discharge optical emission spectrometry (usually abbreviated to "GDS analysis") as a means for measuring the distribution of the forsterite and spinel in the primary film. The GDS analysis will now be described. When a gas is sealed in an electronic tube including a cathode and an anode and a voltage is applied, the collision of electrons with the gas gives rise to ionization and discharge. A sample for spectroscopic analysis is mechanically pushed against a cathode block, which isolates the inside of the discharge tube from the air and forms part of the cathode. A sample is mounted, the inside of the discharge tube is evacuated, and a charge gas, for example, an Ar gas is introduced into the discharge tube. The application of a d.c. voltage across the cathode and the anode leads to glow discharge, which causes the sample to be sputtered. The sputtered atom is excited in plasma and emits light inherent in the element when it returns again to the ground state.

When the light is subjected to spectral analysis, information on the elements confined in the cathode, and the amount of the elements, can be obtained. In the analysis of the sample in the direction of the depth thereof, the intensity of a spectral line for each element corresponding to the discharge time is measured to obtain a diagram showing the relationship between the sputtering time and the intensity of emission. The GDS analysis enables the distribution of the elements such as Mg and Al in the thicknesswise direction of the grain oriented silicon steel sheet to be expressed in terms of time instead of the distance from the surface of the sheet.

The state of distribution of the forsterite ($Mg_2SiO_4$) and spinel ($MgAl_2O_4$) can be clearly observed from the positions of peaks derived from Mg and Al. Since Mg is present in both the forsterite ($Mg_2SiO_4$) and spinel ($MgAl_2O_4$), it tends to exhibit a relatively wide distribution. Since, however, the amount of presence of Mg is relatively large in the forsterite, the peak appears on the side of the forsterite.

This suggests that when the forsterite ($Mg_2SiO_4$) is separated from the spinel ($MgAl_2O_4$), the peaks derived from Mg and Al appear separately from each other. The present invention is based on an important finding such that there is a correlationship between the separation of the peak derived from Mg from the peak derived from Al in the primary film of the grain oriented silicon steel sheet and the state of formation of the primary film, and in its turn, the state of growth of the secondary recrystallized grain.

The present inventors have aimed at the distribution and arrangement of forsterite and spinel for forming a primary film and investigated the relationship between the degree of separation of the Mg peak from the Al peak and the film property and, as a result, have found that the steel sheet wherein the Mg peak and the Al peak are distinctly separated from each other exhibits an excellent film property and enables the secondary recrystallization to smoothly proceed.

The above excellent film property is intended to mean that at the outward appearance of the surface of film, speckle, scale or bare spot defect is not observed. The term "scale" is intended to mean that the primary film is widely peeled to some extent, and the term "bare spot defect" is intended to mean a defect wherein the primary film is peeled in dot form.

Figure 3:
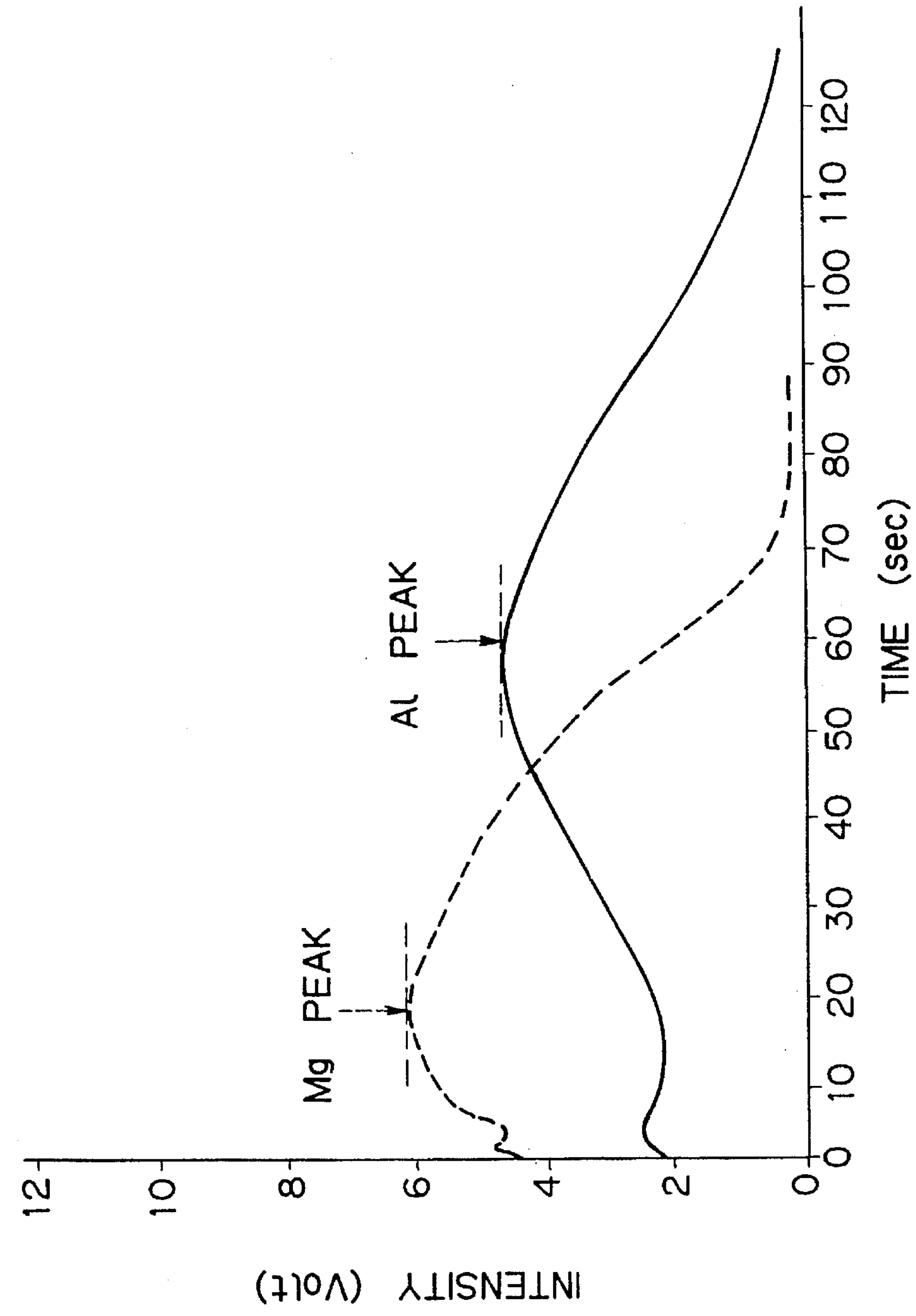
FIG. 3(*a*) is a diagram showing the results of GDS analysis of a grain oriented silicon steel sheet having an excellent primary film, and FIG. 3(*b*) is a diagram showing a peak derived from $Al_2O_3$ different from a peak derived from Al according to the present invention.
Figure 3B:
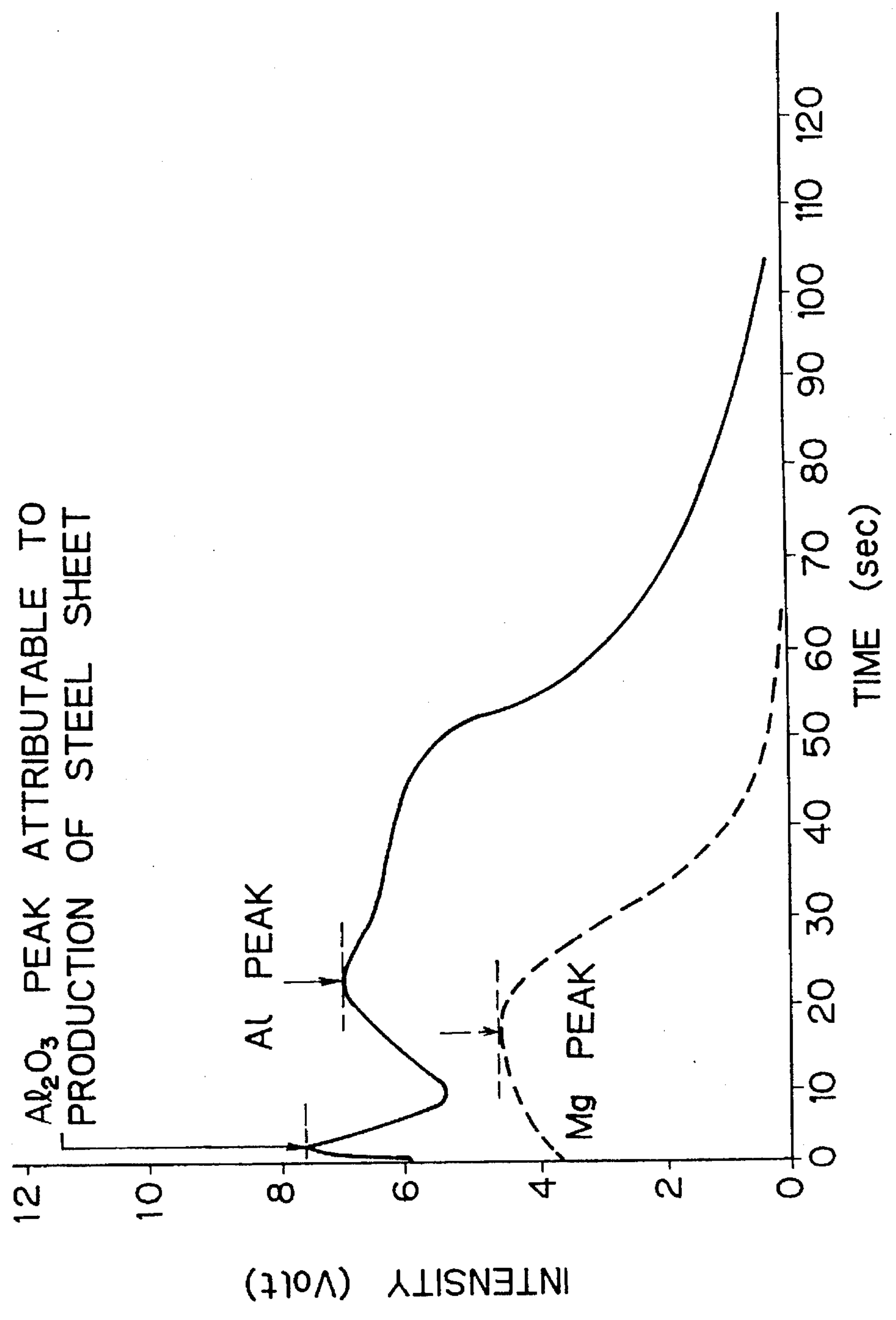

An example of the distribution and arrangement of the primary film is shown in FIG. 3(*a*). As is apparent from the drawing, a Mg peak appears near the outer surface of the grain oriented silicon steel sheet, while an Al peak appears inside the steel sheet.

As shown in FIG. 3(*b*), independently of the peak derived from Al according to the present invention, a peak derived from Al often appears on the outermost surface of the grain oriented silicon steel sheet. This is a peak derived from $Al_2O_3$ attributable to the process for producing the silicon steel sheet and regardless of the peak derived from Al according to the present invention.

Therefore, this peak is excluded, and the maximum value of an Al curve in a GDS chart is regarded as the peak derived from Al according to the present invention, while similarly the maximum value of a Mg curve is regarded as a peak derived from Mg.

The present inventors have clarified the relationship between the time indicating the position of a peak derived from Al and the time indicating the position of a peak derived from Mg is the primary film, and as a result, have found that, when the former time is 1.2 times or more, preferably more than 2 times, the latter time, the forsterite and the spinel are soundly formed separately from each other, a good primary film having an excellent adhesion to the matrix is formed and the secondary recrystallization also proceeds smoothly, so that a good macrostructure of oriented grains (Goss) is obtained, which enables a grain oriented silicon steel sheet having excellent magnetic properties to be provided.

The present inventors made further studies of the mechanism through which a good primary film and secondary recrystallized grains can be formed when the position of a peak derived from Al and the position of a peak derived from Mg are separate from each other.

Figure 5A:
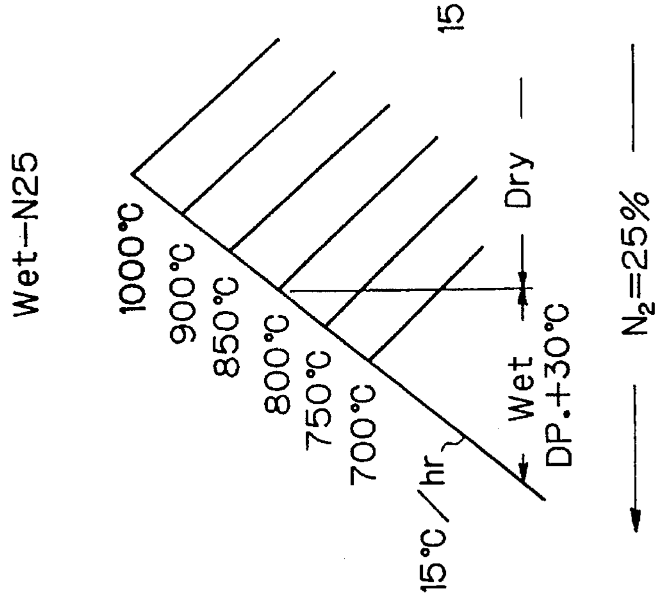
FIG. 5(*a*), FIG. 5(*b*) and FIG. 5(*c*) are each a diagram showing the relationship between the temperature elevation rate, the withdrawal (sample taking out) temperature, and the atmosphere temperature in a withdrawal experiment.
Figure 5B:
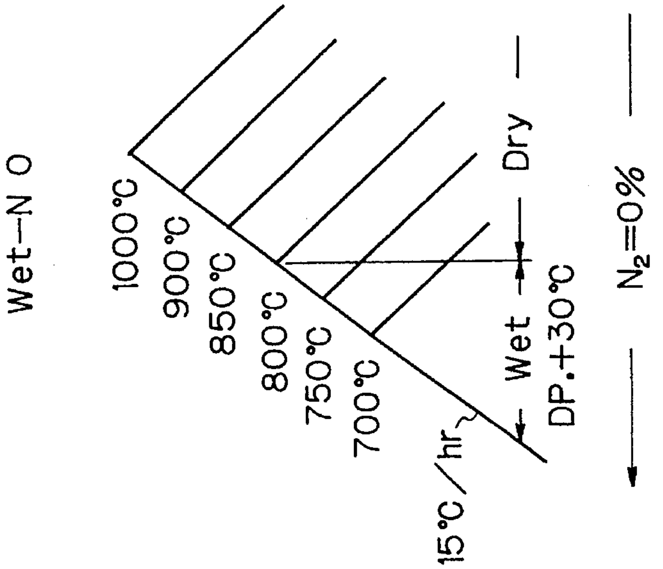
Figure 5C:
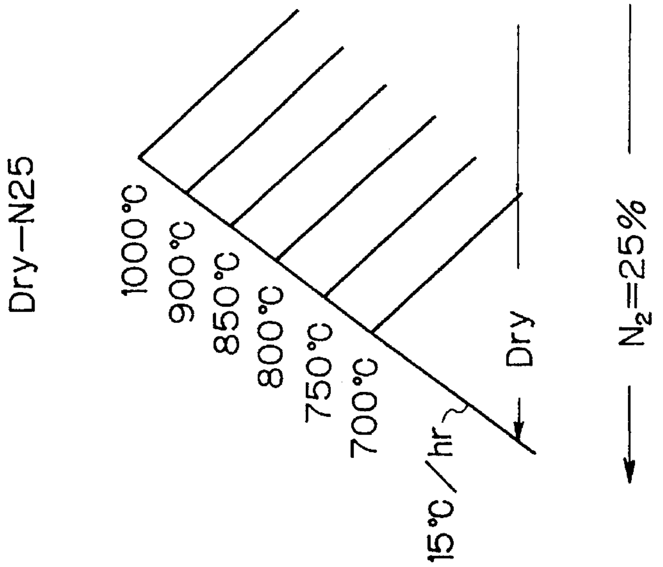

The results of an experiment wherein a steel strip having a Si content of 3% after the primary recrystallized annealing (decarborization) is coated with the annealing separator composed mainly of slurry MgO and withdrawn (sample taking out) during the each temperature step of secondary recrystallization annealing are given in Table 1. The term "Sb-based" and "B-based" in the column of "Powder" (the annealing separator) of Table 1 respectively mean that use was made of the annealing separator comprising MgO and, added thereto, 5% of $TiO_2$ and 0.2% of $Sb_2(SO_4)_3$ and the annealing separator comprising MgO and, added thereto, 5% of $TiO_2$ and 0.3% of $Na_2B_4O_7$. The secondary recrystallization was conducted by a method shown in FIG. 5(*a*), FIG. 5(*b*) and FIG. 5(*c*), and samples were withdrawn at respective indicated temperatures. The surface of the samples thus obtained was subjected to GDS analysis. An investigation was conducted into the withdrawal temperature of samples at which a peak derived from Mg and a peak derived from Al appear. The results are given in Table 1.

TABLE 1

Conditions for Withdrawal Experiment and Results of GDS Elementary Analysis

| | Conditions for withdrawal experiment | | | Initiation temp. at which peaks appear | |
|---|---|---|---|---|---|
| Symbol | sheet thickness | powder | atmosphere (%) | Mg peak ($Mg_2SiO_4$) | Al peak ($MgAl_2O_4$) |
| 1111 | 0.23 mm | Sb-based | wet N 25 | 900° C. | 1000° C. |
| 1211 | " | B-based | " | less than 1000° C. (950° C.) | 1000° C. |
| 2111 | 0.30 mm | Sb-based | " | 900° C. | 1000° C. |

TABLE 1-continued

Conditions for Withdrawal Experiment and Results of GDS Elementary Analysis

| Symbol | Conditions for withdrawal experiment: sheet thickness | powder | atmosphere (%) | Initiation temp. at which peaks appear: Mg peak ($Mg_2SiO_4$) | Al peak ($MgAl_2O_4$) |
|---|---|---|---|---|---|
| 2211 | " | B-based | " | less than 1000° C. (950° C.) | 1000° C. |
| 1121 | 0.23 mm | Sb-based | wet N 0 | 900° C. | 1000° C. |
| 1221 | " | B-based | " | less than 1000° C. (950° C.) | 1000° C. |
| 2121 | 0.30 mm | Sb-based | " | 900° C. | 1000° C. |
| 2221 | " | B-based | " | less than 1000° C. (950° C.) | 1000° C. |
| 1131 | 0.23 mm | Sb-based | Dry N 25 | 900° C. | 1000° C. |
| 1231 | " | B-based | " | less than 1000° C. (950° C.) | 1000° C. |
| 2131 | 0.30 mm | Sb-based | " | 900° C. | 1000° C. |
| 2231 | " | B-based | " | less than 1000° C. (950° C.) | 1000° C. |

The temperature within ( ) in the column of "Mg peak appearance initiation temperature" indicates that the peak appeared at the middle of the measuring temperature.

The results given in Table 1 show that, in both the Sb-based powder and the B-based powder, a peak derived from Mg appears before a peak derived from Al, the peak derived from Al appears at a constant temperature, i.e., 1000° C., under any condition, and in the Sb-based powder, the forsterite is formed at a lower temperature than that in the case of the B-based powder. This is very important to the separation of the peak derived from Mg from the peak derived from Al. Specifically, when the primary film is formed, the forsterite is first formed, and the spinel is then formed. The forsterite is formed when a reaction represented by the following formula occurs $$MgO+SiO_2 \rightarrow Mg_2SiO_4$$

between MgO as a main component of the annealing separator and $SiO_2$ concentrated on the surface of the steel sheet.

The present inventors believe that, in the process for producing a grain oriented silicon steel sheet wherein a fine precipitate of AlN is allowed to function as a main inhibitor at the stage of the progress of the development of the secondary recrystallization, AlN decomposes, diffuses on the surface of the steel sheet, and gives rises to a reaction with Mg on the surface of the steel sheet to form a spinel.

It is believed that, in the secondary recrystallization annealing step, the forsterite is first produced on the surface of the steel sheet and Al diffused during the temperature rise slightly later than the formation of the forsterite, and reacted with the forsterite to form the spinel.

Figure 4:
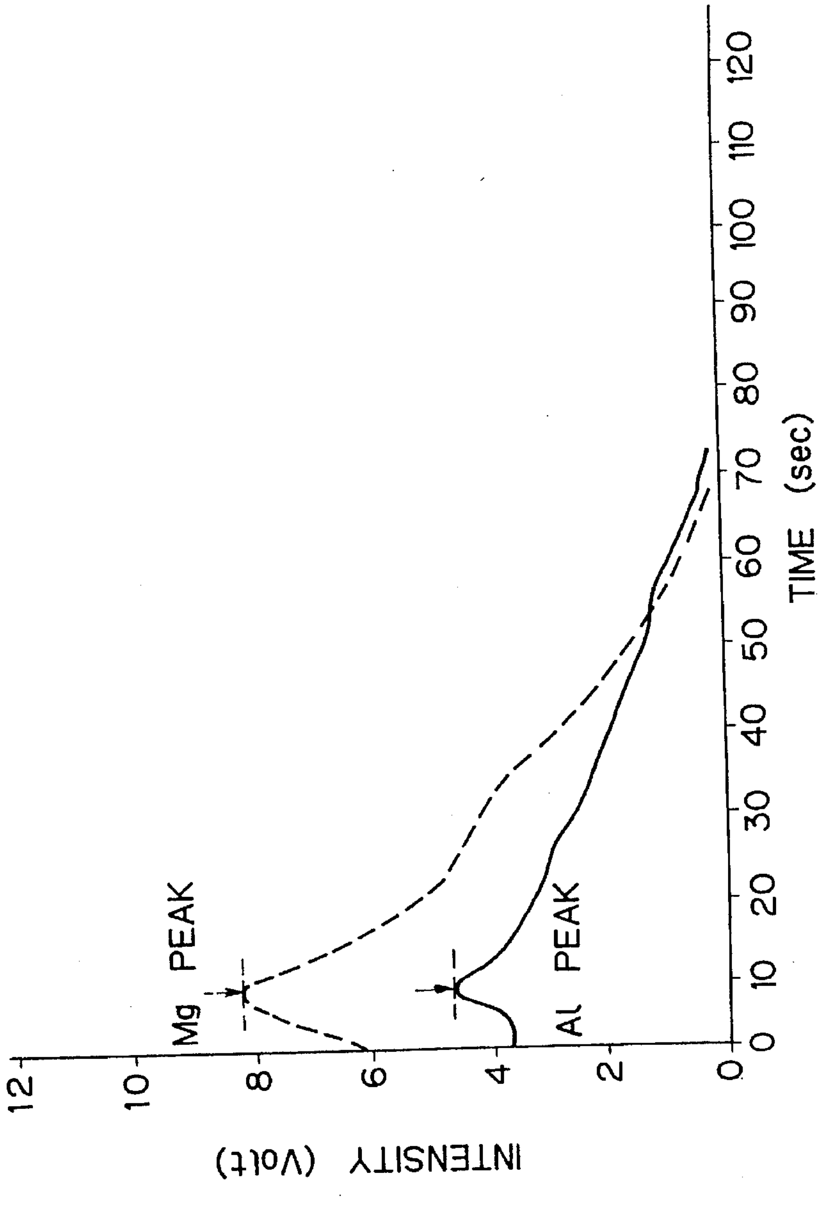
FIG. 4(*a*) and FIG. 4(*b*) are each a diagram showing the results of GDS analysis for a poor primary film.
Figure 4:
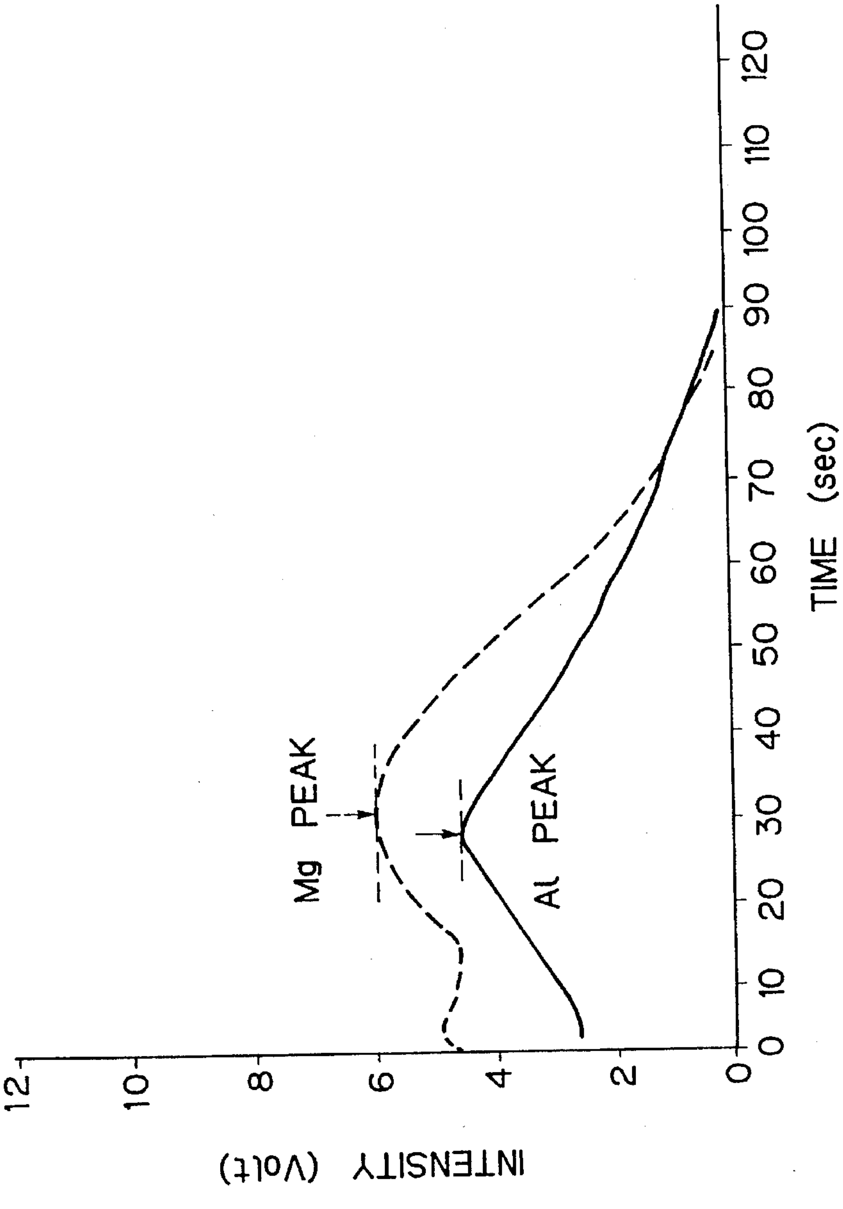

In the secondary recrystallization annealing, when the forsterite is first sufficiently formed in the step of temperature elevation and the above-described spinel reaction occurs accompanying the diffusion of Al on the surface of the steel sheet, it is a matter of course that Al will react with forsterite present in the foot of the distribution curve of the forsterite i.e., with a part of the forsterite in the inner part of the steel sheet, due to the geometrical relationship, so that a peak derived from Al appears. This is an ideal state, and the following state is unfavorable. Specifically, when the formation of the forsterite is not sufficient and the foot of the distribution curve of the forsterite is near the surface of the steel sheet, the peak derived from Mg overlaps the peak derived from Al. When the formation of the forsterite is delayed for some reason and the formation of the forsterite occurs simultaneously with the diffusion of Al on the surface of the steel sheet, there is a possibility that an overlapping of both peaks with each other or the inversion of positions of the peaks will occur as shown in FIG. 4(*a*) or 4(*b*). In this case also, the primary film has a still strong tension but the film property deteriorates, i.e., a scale or bare spot defect occurs.

That the peak derived from Mg is separated from the peak derived from Al and the peak derived from Al is located at a deeper position of the inside of the steel sheet than that derived from Mg suggests that the forsterite, as such, has been successfully formed.

Then, in the process for producing the grain oriented silicon steel sheet, the present inventors have studied how to control the structure of the primary film. As described above, when a causal relation between the process of the formation of the primary film and the various properties of the silicon steel sheet is elucidated, a technical means of forming a preferred primary film on a commercial scale can be provided.

At the outset, the state of $SiO_2$ on the surface of the steel sheet as well is important to the formation of forsterite at a low-temperature stage. In the case of a powder reaction in nitrogen, the indication of the initiation of formation of forsterite appeared when the system was maintained at 850° C. for 2 hr for a mixture of MgO with amorphous $SiO_2$, 950° C. for 2 hr for a mixture of MgO with silica gel and 1000° C. for 2 hr for a mixture of MgO with β-quarts. Thus, very careful attention should be paid to the state of $SiO_2$ formed during the primary recrystallization and decarborization annealings prior to the secondary recrystallization annealing. Specifically, amorphous $SiO_2$ should be formed as much as possible by preventing an excessive increase in the ignition temperature during the decarbonization annealing.

The presence of a small amount of an impurity rather than a reaction of pure MgO with pure $SiO_2$ is advantageous for accelerating the reaction $MgO+SiO_2 \rightarrow Mg_2SiO_4$. This is the same as that in the case of the conventional ceramic reaction. In the case of a grain oriented silicon steel sheet, however, the conditions are limited to those having no adverse effect on the magnetic property and glass film property.

Therefore, an annealing separator becomes very important to the formation of forsterite at a low-temperature stage in the secondary reclistallization annealing.

The annealing separating agent used is composed mainly of MgO, and it is preferable to add as additives $TiO_2$, a borate, a sulfate, etc. It is considered that the addition of these salts to MgO and $TiO_2$ causes MgO as an annealing separating agent and $SiO_2$ formed during the primary recrystallization and decarborization annealings to begin to react with each other from a low-temperature stage in the secondary recrystallization annealing, so that forsterite is formed at the low-temperature stage in this annealing.

As shown in Table 1, when a small amount of MgO is added to an Sb-based compound, since MgO melts at a relatively low temperature, the rate of formation of the forsterite increases with lowering the temperature elevation rate in the step of secondary recrystallization annealing. Further, since the diffusion rate of Al is determined by the temperature, the peak derived from Mg and the peak derived from Al are more distinctly separated from each other, so that an excellent primary film is formed. With respect to the Sb compound, use may be made of not only the above-described $Sb_2(SO_4)_3$ but also other compound containing Sb as an additive to the annealing separator.

Even in the same low-melting compound, when a B-based compound is added to the annealing separator, since MgO melts at a higher temperature than where an Sb-based compound is added, the rate of formation of the forsterite increases with increasing the temperature elevation rate in the secondary recrystallization annealing step. Further, since the rate of diffusion of Al is mainly determined by only the temperature, it is believed that the peak derived from Mg and the peak derived from Al are more distinctly separated from each other, so that a primary film is formed. With respect to the B-based compound, use may be made of not only the above-described Na-based compound but also a compound containing Ca, Mg or other compound instead of Na and boric acid ($H_3BO_3$) and sodium borate as an additive to the annealing separator.

As with the B-compounds, strontium-barium-based, carbon-nitride-based, sulfide-based compounds, and chloride-based compounds having a higher melting point than that of the Sb-based compounds may be used.

In the present invention, the reason why the Si content is limited to 2.0 to 5.0% by weight will now be described. Si is important to the enhancement in the electrical resistance and the lowering in the iron loss. However, when the Si content exceeds 5.0%, the steel becomes liable to cracking at the time of cold rolling. On the other hand, when the Si content is less than 2.0% by weight, the electrical resistance is so low that it is difficult to lower the iron loss.

Further, in order to accelerate the formation of forsterite at 1000° C. or below, it is useful to lower the temperature rise rate in the secondary recrystallization annealing and to conduct a sufficient heat treatment at 1000° C. or below.

It is considered that acid-soluble Al in the steel decomposes from the nitride and the formation of spinel proceeds according to the following reaction $Mg_2SiO_4+Al+Al_2O_3 \rightarrow MgAl_2O_4+Si$. For this purpose, it is usually desired that, prior to the formation of spinel, $Al_2O_3$ is formed to some extent and the secondary recrystallization is completed. In other words, it is important that Al in a solid solution form in the steel be oxidized at a low temperature to $Al_2O_3$ in a weakly oxidizing atmosphere and the secondary recrystallization be completed prior to the decomposition of nitride of Al as a precipitation dispersed phase.

A process for producing the grain oriented silicon steel sheet having excellent primary film properties according to the present invention will now be described.

The grain oriented silicon steel sheet having excellent primary film properties contains Al and is produced by a production process wherein AlN is allowed to serve as a main inhibitor. It is a matter of course that Mn, S, Sn, Se, Cu, B, Nb, Ti, V, Sb, Ni, etc. besides Al may be additionally added and may be used as an inhibitor forming element.

It is possible that the grain oriented silicon steel sheet having an excellent primary film property according to the present invention be produced by a process wherein Al is incorporated in an amount of 0.010 to 0.065% to a steel containing 2 to 5.0% of Si during the production of a steel by the melt process and incorporating N during the production of a steel by the melt process or nitriding the steel sheet in any stage between primary recrystallization annealing and the initiation of secondary recrystallization in the secondary recrystallization annealing step so that the nitrogen content of the steel at a temperature of 1000° C. in raising the temperature in the secondary recrystallization annealing step is in the range of from 0.0040 to 0.0500%.

The reason for the ranges of ingredients in the present invention will now be described.

Si (silicon) should be improve present in an amount of at least 2% for forming forsterite and magnetic properties, one of the reasons, are the restriction of γ-phase in the secondary recrystallization annealing. When the Si content exceeds 5.0%, the workability of the steel sheet is remarkably deteriorated, so that the silicon steel sheet of the present invention cannot be mass-produced on a commercial scale. Preferably 4.5% or less Si content is much more easy in the production.

Al (aluminum) is an element indispensable for allowing AlN to serve as an inhibitor and forming spinel in the primary film of the silicon steel sheet of the present invention and should be present in an amount of at least 0.010% before starting of the secondary recrystallization annealing. When the content exceeds 0.065%, the amount of formation of $Al_2O_3$ becomes so large that cleanness of the sound steel is spoiled. This in turn has an adverse effect on the magnetic properties of the product.

N (nitrogen) is an element indispensable for allowing AlN to serve as an inhibitor and should be present in an amount of at least 0.0040% at a temperature of 1000° C. when raising the temperature in the step of secondary recrystallization annealing. When the content exceeds 0.065%, the secondary recrystallization is unstable.

In the present invention, although elements other than the above-described elements are not particularly important, compared with those in the case of the conventional silicon steel sheet, it is preferred to specify the other elements as follows.

C (carbon) should be subjected to a lowering in the content during the production of a steel by the melt process or in the step of primary recrystallization annealing which also serves as the decarbonization step. The carbon content of the steel at the time of initiating the secondary recrystallization annealing is preferably 0.0030% or less.

Mn (manganese) forms favorable MnS which serves as an inhibitor when the content is 0.5% or less. When the content is 0.15% or less, the magnetic flux density of the product is further favorably elevated.

O (oxygen) forms no excessive $Al_2O_3$ and gives rise to no problem with respect to the cleanness of the steel when the content is 0.005% or less.

The balance consists of Fe and unavoidable impurities.

The process for producing an grain oriented silicon steel sheet having excellent primary film properties according to the present invention will now be described.

A steel is produced in a converter or an electric furnace by the melt process. If necessary, the steel is subjected to the refining step to adjust the ingredients, thereby preparing a molten steel which is then continuously cast to directly prepare a slab. Alternatively, the molten steel may be poured into a mold which is soaked and then subjected to slab rolling. Thickness of the slab is from 30 to 400 mm. When the thickness of the slab is less than 30 mm, the productivity becomes very low. On the other hand, when the thickness of the slab exceeds 400 mm, the distribution of $Al_2O_3$ becomes abnormal due to the center segregation.

The slab thus prepared is heated to a temperature of from 1000° to 1400° C. by means of a gas combustion flame or an electric energy and hot-rolled into a hot-rolled sheet (hot strip) having a thickness of 10 mm or less. The reason why the lower limit of the heating temperature of the slab or thin case strip was specified to 1000° C. is that the lower limit of dissolution of AlN is 1000° C. When the heating temperature exceeds 1400° C., not only does the surface roughening become significant but also the quality of the material is deteriorated.

When the thickness of the hot-rolled strip exceeds 10 mm, it becomes impossible to attain a cooling rate necessary for forming a fine precipitate which serves as an inhibitor.

It is preferred to use a process wherein the hot-rolled strip is annealed at a temperature in the range of from 800° to 1250° C., for improving the magnetic properties of the product. When the annealing temperature is below 800° C., AlN is not redissolved, but when the annealing temperature exceeds 1250° C., AlN is precipitated in the form of coarse precipitates, and thus cannot serve as an inhibitor.

Then the material is pickled and cold-rolled. The cold rolling is conducted with a reduction rate of 70 to 95%. When the reduction rate is less than 70%, the amount of grains having a {111} [112] orientation is small in the primary recrystallization annealing, which also serves for a decarbonization, so that the formation of grains having a Goss orientation cannot be promoted in the step of secondary recrystallization annealing. On the other hand, when the reduction rate exceeds 95%, in the step of secondary recrystallization annealing, there form grains unfavorable for magnetic properties, called "rotating Goss grains", wherein grains having a Goss orientation are rotated within the sheet plane. This applies to a case where the material is rolled into a final sheet thickness by an once cold rolling. When the material is rolled into a final sheet thickness by the step of twice cold rolling with intermediate annealing, the first cold rolling is conducted with reduction rate of 10 to 80% and the second cold rolling after the intermediate annealing is conducted with a reduction rate of 50 to 95%. When the reduction rate in the first cold rolling is less than 10%, no recrystallization occurs. When the reduction rate in the first cold rolling and the reduction rate in the second cold rolling exceeds 80% and 95%, respectively, it becomes impossible to form proper grains having a Goss orientation at the time of secondary recrystallization in the secondary recrystallization annealing step. When the reduction rate in the second cold rolling is less than 50%, it becomes impossible to increase the amount of grains having a {111} [112] orientation in the primary recrystallization annealing and to promote the formation of grains having a Goss orientation in the step of secondary recrystallization annealing.

It is a matter of course that it is possible to conduct known between-passes aging in a cold rolling wherein the material is held at a temperature of from 100° to 400° C. to improve the magnetic properties. In this case, when the holding temperature is below 100° C., no effect can be attained by the between-passes aging, and when the temperature exceeds 400° C., the dislocation derived from the cold rolling unfavorably recovers.

The material which has been cold-rolled into a final thickness is then subjected to primary recrystallization annealing, which also serves for the decarbonization. C (carbon) in the material is not only unfavorable for the growth of secondary recrystallized grains but also deteriorates the magnetic properties, especially iron loss properties (increases the iron loss value). When the carbon content is made low during the production of the steel by the melt process, not only is the decarborization time shortened but also the amount of grains having a {111} [112] orientation becomes favorably large.

In the primary recrystallization annealing which serves also as decarbonization, an oxidation layer necessary for the formation of primary film in the step of secondary recrystallization annealing can be ensured by properly setting the dew point of the annealing atmosphere.

The primary recrystallization annealing which serves also as decarborization is preferably conducted at a temperature of 700° to 950° C. When the temperature is below 700° C., no primary recrystallization occurs, but when the temperature exceeds 950° C., coarse grains occur.

In order to form AlN, which serves as an inhibitor, it is also possible to use a process wherein N is added by subjecting a steel sheet to a nitriding treatment at a temperature of 600° to 950° C., for example, in an atmosphere containing an ammonia gas, at any stage between the primary recrystallization annealing and the initiation of secondary recrystallization in the secondary recrystallization annealing step. When the nitriding temperature is below 600° C., the nitriding of the steel sheet is insufficient, and when the temperature exceeds 950° C., coarse grains occur.

After the primary recrystallization annealing, which also serves for the decarborization, the material (strip) is coated with an annealing separator composed mainly of MgO in the form of a slurry. In this case, the change of weight of MgO between before and after drying and the grain size plays an important role in forming a film.

Specifically, the change of weight of MgO between before and after drying should be in the range of from 0.5 to 5.0%, preferably 0.5 to 1.5% in terms of Ignition loss. When the Ignition loss value is less than 0.5%, the reaction of MgO is so poor that the glass film becomes defective. On the other hand, when the Ignition loss value is more than 5.0%, the glass film becomes an excessively oxidized state, so that the glass film becomes defective. If the Ignition loss value is equal or below 1.5%, more smooth primary film can be obtained. The grain size of MgO as well is an important factor and should be 1 to 30 μm at least 70% within total size. When it increases, the grain size is 1 μm or less, the glass film becomes excessively oxidized, while when it increases, the grain size is more than 30 μm, the grain size is so large that the glass film becomes defective.

Also, the final rate of reaction, i.e., 40% value, of citric acid activity (CAA value) of 70 to 200 seconds is the most suitable.

Therefore, in order to react MgO under optimal conditions, an Igloss value of 0.5 to 5.0% and a MgO grain size of 1 to 30 μm at least 70% within total size are conditions necessary for the formation of an ideal glass film, in this case, the above 40% value of CAA value is a region of 70 to 150 seconds.

In this case, in the subsequent step of secondary recrystallization annealing, a proper compound is added in a small amount to the annealing separator for the purpose of facilitating the melting of the melting of the MgO powder and accelerating the reaction of formation of the forsterite. When $TiO_2$ is added, the amount of addition is preferably in the range of 1 to 15%. When the amount of addition is less than 1%, the effect of accelerating the reaction of formation of the forsterite is not attained. When the amount of addition exceeds 15%, however, the amount of MgO becomes relatively small, which unfavorably inhibits the reaction of the forsterite. The addition of a Sb-based (antimony-based) compound, such as $Sb_2(SO_4)_3$, to the annealing separator effective for melting MgO at a relatively low temperature in the secondary recrystallization annealing step.

In the addition of the Sb-based (antimony-based) compound to the annealing separator, the amount of addition is preferably from 0.05 to 5.0%. When the amount of addition of the Sb-based (antimony-based) compound is less than 0.05%, the effect of melting MgO at a relatively low temperature in the step of secondary recrystallization annealing cannot be exhibited, and when the amount of addition exceeds 5.0%, an intended reaction for converting MgO to forsterite is inactivated.

B-based (boron-based) compounds, such as $Na_2B_4O_7$, and compounds having an activity similar thereto, such as strontium-barium based, carbon-nitride-based, sulfide-based and chloride-based compounds, are more effective for melting MgO at a relatively high temperature than the Sb-based (antimony-based) compounds. When these compounds are added to the annealing separator, the amount of addition is preferably from 0.05 to 5.0%. When the amount of addition of these compounds is less than 0.05%, the effect of melting MgO cannot be attained in the secondary recrystallization annealing step, and when the amount of addition exceeds 5.0%, an intended reaction for converting MgO to forsterite is inactivated. These compounds are useful even when added as a combination of two or more thereof.

When an Sb-based compound having a low melting temperature is mixed with a B-based compound having a high melting temperature and the mixture is used as an additive to the annealing separator, the effect of the addition is similar to that of the B-based compound having a high melting temperature. In this case, in the secondary recrystallization annealing step, the temperature elevation rate is preferably that adopted when the compound having a high melting temperature is added. The amount of addition of various compounds to the annealing separator is a weight proportion, taking the weight of MgO as 100%.

In the secondary recrystallization annealing step, it is preferred that the maximum ultimate temperature be from 1100° to 1300° C. When the maximum optimum temperature is less than 1100° C., the primary film growth and purification reaction are insufficient, and when the maximum optimum temperature exceeds 1300° C., it is unfavorable because of the increase in the production cost. As for a method of nitriding a steel strip at any stage between the primary recrystallization annealing also serving for the decarbonization and the initiation of the secondary recrystallization, elevating the partial pressure of nitrogen in an annealing atmosphere in the step of raising the temperature before the occurrence of secondary recrystallization, in the secondary recrystallization annealing step, may be used, together with a method of nitriding during or just after primary recryatallization annealing, as one method wherein a steel sheet is nitrided.

The temperature elevation rate in the step of secondary recrystallization annealing is very important to the present invention.

Specifically, the peak derived from Mg can be separated from the peak derived from Al depending upon the melting conditions of MgO and by the diffusion of Al on the surface of the steel sheet. Therefore, the temperature elevation rate in the step of secondary recrystallization annealing should be set depending upon the kind of the compound to be added to the annealing separator composed mainly of MgO. When an Sb-based compound is added to an annealing separator, the average temperature elevation rate of between 800° C. and the maximum optimum temperature is preferably relatively low, i.e., from 0.1 to 80° C./hr. When the average temperature elevation rate is lower than 0.1° C./hr, the productivity is remarkably lowered, on the other hand, when an Sb-based compound is added to the annealing separator, since MgO melts at a relatively low temperature, it is necessary to form the forsterite at a higher rate as early as possible. For this reason, the average temperature elevation rate should be 80° C./hr or lower.

When B-based (boron-based), strontium-barium-based, carbon-nitride-based, sulfide-based and chloride-based compounds are added to the annealing separator, the average temperature elevation rate between 800° C. and the maximum optimum temperature is preferably relatively high, i.e., from 5° to 400° C./hr.

When the above-described compound having rather a high melting temperature is added to the annealing separator, since the MgO melts at a relatively high temperature in the secondary recrystallization annealing step, the average temperature elevation rate should be at least 5° C./hr, to allow the temperature to rapidly reach a high temperature region. When the average temperature elevation rate exceeds 400° C./hr, however, the secondary recrystallization does not sufficiently occur and proceed, due to a relationship between the secondary recrystallization and the inhibitor.

An organic or inorganic secondary coating may be formed on an grain oriented silicon steel sheet having a good primary film for the purpose of improving insulating properties and magnetic properties. For example, it is also possible by apply a laser beam or other energy focusing beam to the surface of the steel sheet, or by machining or chemical etching to subdivide the magnetic domain to thus improve the iron loss properties.

According to the present invention, the means for forming forsterite at the low temperature stage in the secondary recrystallization annealing is not limited to the above-described methods. For example, it is also possible to add, in addition to the above-described annealing separator, an additive capable of accelerating the formation of a primary film at a low-temperature stage of the secondary recrystallization annealing.

The present invention will now be described in detail with reference to the following examples that by no means limit the scope of the invention.

EXAMPLE 1

150 kg of a steel including AlN (example of the invention) and a steel not including AlN (Comparison) specified in Table 2 were prepared in a vacuum melting furnace. The steels were cast, heated and hot-rolled into a hot-rolled sheet having a thickness of 2.3 mm. The hot-rolled sheets were subjected to annealing at 1120° C. for 30 sec. Materials prepared by annealing the hot-rolled sheets were pickled and cold-rolled with a reduction rate of 90% into a final thickness of 0.22 mm. In the cold rolling step, the materials were subjected to the between-pass aging wherein it were held at a temperature of 250° C. Thereafter, the materials were washed cleaning an oil, subjected to primary recrystallization annealing serving also as decarborization at a temperature of 830° C. for 120 sec in an atmosphere comprising 25% of nitrogen and 75% of hydrogen and having a dew point of 60° C., and then coated with the following annealing separator.

(1) $MgO+TiO_2$ (5%) . . . plain (2) $MgO+TiO_2$ (5%)+$Sb_2(SO_4)_3$ (0.2%: Sb-based), (0.02)%: low Sb-based), (6.0%: high Sb-based)

(3) $MgO+TiO_2$ (5%)+$Na_2B_4O_7$ (0.3%: B-based), (0.03%: low B-based), (7.0%: high Sb-based)

(4) $MgO+MgSO_4$ (4%)+$FeSO_4$ (0.1%)+$Na_2B_4O_7$ (0.5%) . . . sulfide-based (5) $MgO+SrCO_3$ (0.08%)+$BaCl_2$ (0.5%)+$Ba(H)_2$ (0.1%) . . . strontium-barium-based (6) $MgO+V_2O_5$ (5%)+CrN (3%) . . . carbon-nitride-based (7) $MgO+MnO_2$ (0.2%)+$TiO_2$ (8%)+$TiCl_4$ (0.5%) . . . chloride-based The annealing separator was dissolved in water to form a slurry, coated with a roll coater and dried in a furnace of 350° C. Then, in the secondary recrystallization annealing step, the temperature elevation between 800° C. and the maximum optimum temperature was elevated at the temperature elevation rate of 0.1 to 400° C./hor in accordance with a kind of addition material of the annealing separator to conduct a secondary recrystallization of the steel sheet. The material as annealed was washed with water, coated with a phosphoric-acid-insulating coating (secondary coating) and then baked. Then, the resultant silicon steel sheet was subjected to stress relief annealing in a dry atmosphere composed of 90% nitrogen and 10% hydrogen at 850% for 4 hr and then subjected to GDS analysis, outward appearance test of the primary film and macrostructure, magnetic measurement, measurement of the primary film tension, and an adhesion test. The results are shown in Tables 3 and 4 (continuation of Table 3).

The results were expressed as follows. O: neither scale nor bare shot defect observed, Δ: slight bare shot defect observed, and x: primary film not sufficiently formed due to severe occurrence of scale and bare shot defect. The results of the macroscopic appearance test which is conducted to observe a degree of secondary recrystallization on a sample of which primary film is dissolved by acid were expressed as follows. O: secondary recrystallized structure sufficiently formed, Δ: fine grain partially observed, and x: fine grain wholly observed.

In the elementary analysis according to GDS, the distance from the surface of the steel sheet to the center portion of the direction of the sheet thickness was expressed in terms of the time (sec), and a position where a peak derived from Mg or Al appeared was detected. Further, the ratio of the Al peak appearance time to the Mg peak appearance time was determined.

The magnetic measurement was conducted by SST (Single Sheet Tester) testing method for a single sheet having a width of 60 mm and a length of 300 mm. In the magnetic measurement, the $B_8$ value [magnetic flux density (gauss) in 800 A/m] and the $W_{17/50}$ [iron loss value (w/kg) in alternating magnetic field of 1.7 Tesla at 50 Hz].

The tension of the primary film was determined by removing the primary and secondary films provided on one surface of the steel sheet, measuring the deflection of the steel sheet caused at that time and calculating the tension of the primary film. The larger the value obtained by the calculation, the larger the tension caused in the steel due to the difference in the coefficient of thermal expansion between the primary film and the matrix, which contributes to a remarkable improvement in the iron loss property.

As apparent from Tables 3 and 4, good results can be obtained from property tests of all the grain oriented silicon steel sheets containing AlN produced through the use of an annealing separator containing an Sb-based (antimony-based) compound and at the state that the temperature elevation rate in the secondary recrystallization annealing step is low and that the ratio of the time taken for the peak derived from Al to appear (which represents the distance from the surface of the steel sheet to the center of the thicknesswise direction) to the time taken for the peak derived from Mg to appear is 1.2 or more. On the other hand, a steel sheet not containing AlN did not have a good outward appearance, a good macroscopic outward appearance or good magnetic properties.

TABLE 2

Chemical Ingredients of Steel in Example of the present invention or comparison (unit: wt. %)

| | C | Si | Mn | P | S | O | Al | N |
|---|---|---|---|---|---|---|---|---|
| the present invention | 0.08 | 3.24 | 0.07 | 0.008 | 0.026 | 0.002 | 0.024 | 0.0080 |
| comparison | 0.070 | 3.20 | 0.060 | 0.009 | 0.025 | 0.002 | 0.003 | 0.0045 |

TABLE 3

Production Conditions and Experimental Results of Example of the present invention or comparison: (0.22 mm)

| | | | Results of GDS elementary analysis | | |
|---|---|---|---|---|---|
| Symbol | Kind of powder | Temp. elevation rate in secondary recrystallization (°C./hr) | Al peak appearance time (sec) (=a) | Mg peak appearance time (sec) (=b) | a/b |
| 1-1 | Sb-based | 15 | 70 | 15 | 4.7 |
| 1-2 | Sb-based | 0.3 | 75 | 10 | 7.5 |
| 1-3 | Sb-based | 90 | 22 | 20 | 1.1 |
| 1-4 | B-based | 80 | 50 | 30 | 1.7 |
| 1-5 | B-based | 7 | 70 | 20 | 3.5 |
| 1-6 | B-based | 100 | 20 | 20 | 1.0 |
| 1-7 | plain | 20 | 28 | 15 | 1.9 |
| 1-8 | sulfide-based | 10 | 40 | 10 | 4.0 |
| 1-9 | strontium-barium-based | 100 | 50 | 15 | 3.3 |

TABLE 3-continued

Production Conditions and Experimental Results of Example of the present invention or comparison: (0.22 mm)

| Symbol | Kind of powder | Temp. elevation rate in secondary recrystallization (°C./hr) | Results of GDS elementary analysis: Al peak appearance time (sec) (=a) | Mg peak appearance time (sec) (=b) | a/b |
|---|---|---|---|---|---|
| 1-10 | nitride-based | 50 | 35 | 20 | 1.8 |
| 1-11 | chloride-based | 50 | 40 | 20 | 2.0 |
| 1-12* | Sb-based | 15 | — | 10 | — |
| 1-13* | B-based | 20 | — | 20 | — |

Note:
* mark is comparison

TABLE 4

(continuation of Table 3)

| Symbol | Appearance of primary film | Macroscopic appearance | Results of magnetic measurement of SST single sheet: $B_8$ (gauss) | $W_{17/50}$ (watt/kg) | Tension of primary film ($kgf/mm^2$) |
|---|---|---|---|---|---|
| 1-1 | o | o | 1.92 | 0.80 | 1.6 |
| 1-2 | o | o | 1.91 | 0.85 | 1.7 |
| 1-3 | Δ | o | 1.91 | 0.86 | 1.6 |
| 1-4 | o | o | 1.92 | 0.85 | 1.0 |
| 1-5 | o | o | 1.92 | 0.85 | 1.4 |
| 1-6 | Δ | Δ | 1.91 | 0.85 | 1.6 |
| 1-7 | o | o | 1.90 | 0.90 | 1.2 |
| 1-8 | o | o | 1.95 | 0.80 | 1.6 |
| 1-9 | o | o | 1.92 | 0.85 | 1.5 |
| 1-10 | o | o | 1.93 | 0.95 | 1.2 |
| 1-11 | o | o | 1.92 | 0.85 | 1.4 |
| 1-12* | x | x | 1.88 | 1.20 | 0.3 |
| 1-13* | x | x | 1.87 | 1.10 | 0.4 |

Note:
* mark is comparison

EXAMPLE 2

Steels having the chemical compositions specified in Tables 5 were produced in a converter, the steels were formed by the same production process as shown in as Example 1 and products having a thickness of 0.30 mm were produced by a final cold rolling at a reduction rate of 80%. Next, after the primary recrystallization annealing, the steel sheets were nitrided in an atmosphere containing ammonia gas, or the steel sheets were nitrided during the temperature elevating stage in the secondary recrystallization annealing step. The various compounds added to the annealing separator are the same as those used in Example 1. The resultant products were subjected to the same various characteristic tests as those conducted in Example 1.

The results were given in Table 6. As apparent from Table 6, the samples satisfying the requirements of the present invention exhibited good results in all of the characteristic tests. It is apparent that the ratio of the time taken for the peak derived from Al to appear (distance from the surface of the steel sheet to the center of the thicknesswise direction) to the time taken for the peak derived from Mg to appear is especially important.

TABLE 5

Production Conditions and Experimental Results of Example 2 (0.30 mm)

| Symbol | Chemical ingredients C (wt. %) | Si (wt. %) | Mn (wt. %) | S (wt. %) | Al (wt. %) | N (ppm) | other additive element (wt. %) |
|---|---|---|---|---|---|---|---|
| 2-1 | 0.050 | 3.20 | 0.10 | 0.020 | 0.025 | 90 | Sn: 0.05 |
| 2-2 | " | " | " | " | " | " | " |
| 2-3 | " | " | " | " | " | " | " |
| 2-4 | " | " | " | " | " | " | " |

TABLE 6

(continuation of Table 5)

| Symbol | Results of GDS elementary analysis: Al peak appearance time (sec) (=a) | Mg peak appearance time (sec) (=b) | a/b | Appearance of primary film | Macroscopic appearance | Results of magnetic measurement of SST single sheet: $B_8$ (gauss) | $W_{17/50}$ (watt/kg) | Tension of primary film (kg/mm$^2$) |
|---|---|---|---|---|---|---|---|---|
| 2-1 | 10 | 10 | 1.0 | Δ | Δ | 1.89 | 1.00 | 0.5 |
| 2-2 | 10 | 10 | 3.0 | o | o | 1.91 | 0.98 | 0.4 |
| 2-3 | 45 | 15 | 3.0 | o | o | 1.93 | 0.95 | 0.6 |
| 2-4 | 50 | 45 | 1.1 | Δ | Δ | 1.89 | 1.01 | 0.6 |

EXAMPLE 3

The two kinds of hot rolled silicon steel sheets comprising the following;

(1) 3.0 wt % of Si and 0.026 wt % of acid soluble Al, in the present invention;

(2) 3.0 wt % of Si and 0.004 wt % of Al, in the comparative example;

were cold rolled to a final thickness of 0.22 mm, and oxide layers containing $SiO_2$ were formed on the surface of the silicon steel sheet for decarbonization annealing, thereafter, an annealing separator, i.e., a slurry of 100 g of MgO, 5 g of $TiO_2$ and 0.3 g of $Na_2B_4O_7$ suspended in pure water, was coated on the surfaces of the steel sheets and said steel sheets were subjected to the final annealing and heated at an elevating ratio of 15° C./hr up to 1200° C. and held at a temperature for 20 hr, and comprised 25% of $N_2$ and 75% of $H_2$ at the elevated temperature and after reaching 1200° C. comprised 100% of $H_2$.

The grain oriented silicon steel sheets having a magnetic flux density ($B_8$) of about 1.91 T and about 3.6 g/m$^2$ of the primary film were selected from the steel sheets formed by the above process and many properties were measured as shown in Table 7.

Further, the primary film tension has been calculated by measuring deflection caused by a process of eliminating the primary film on one side of a specimen by an acid solution washing (pickling).

Also, the amount of spinel was obtained by the above mentioned process.

TABLE 7

| Symbol | Amount of spinel (g/m$^2$) | Tension of primary film (Kg/mm$^2$) | Iron loss $W_{17/50}$ (W/Kg) | Remarks |
|---|---|---|---|---|
| 3-1 | 0.50 | 0.35 | 0.92 | Invention |
| 3-2 | 0.03 | 0.21 | 0.95 | Comparison |

As shown in Table 7, the present invention has a comparatively larger amount of spinel and higher primary film tension.

EXAMPLE 4

As an annealing separator, a slurry comprising 100 g of MgO, 5 g of $TiO_2$ and 0.2 g of antimony sulfate was used and the examination was carried out by the same process as used in Example 1.

The results are provided in Table 8.

TABLE 8

| Symbol | Amount of spinel (g/m$^2$) | Tension of primary film (Kg/mm$^2$) | Iron loss $W_{17/50}$ (W/Kg) | Remarks |
|---|---|---|---|---|
| 4-1 | 0.55 | 0.38 | 0.91 | Invention |
| 4-2 | 0.03 | 0.21 | 0.94 | Comparison |

As shown in Table 8, the present invention has a comparatively larger amount of spinel and higher tension of primary film. Moreover, it is obvious that the ion loss has a lower value in accordance with the high tension of the primary film.

We claim:

1. A grain-oriented silicon steel strip or sheet having a secondary recrystallized grain having a stable Goss orientation through formation of a stable primary glass film on the surface of the silicon steel strip or sheet, said strip or sheet comprising 2.0 to 5.0% by weight of Si and 0.010 to 0.065% by weight Al before start of secondary recrystallization, wherein the primary glass film formed during secondary recrystallization annealing is composed substantially of forsterite ($Mg_2SiO_4$) and spinel ($MgAl_2O_4$) in which Al is diffused on the surface of the steel strip or sheet from the inside of the strip or sheet;

wherein in an analysis of the surface of the steel strip or sheet by glow discharge optical emission spectrometry analysis a peak derived from Al is separated from a peak derived from Mg and the distance from the surface of the steel strip or sheet at which the peak derived from Al appears is 1.2 times or more the distance from the surface of the steel strip or sheet at which the peak derived from Mg appears.

2. The steel strip or sheet according to claim 1, wherein further Si is diffused on the surface of the steel strip or sheet from the inside of the strip or sheet and at least one oxide selected from the group consisting of cordierite ($Mg_2Al_4SiO_5O_{18}$) and sapphirine ($Mg_4Al_{10}Si_2O_{23}$) is formed inside of said steel strip or sheet.

* * * * *